3,057,046
METHOD FOR THE MANUFACTURE OF METAL BEARINGS OR BEARING SURFACES
Coenraad G. D. Maarschalk, Haarlem, Netherlands, assignor to Maarschalk Handelscompagnie N.V., Haarlem, Netherlands, a limited liability company of the Netherlands
No Drawing. Filed Nov. 12, 1957, Ser. No. 695,485
Claims priority, application Netherlands Nov. 12, 1956
7 Claims. (Cl. 29—149.5)

It is known that in machine construction for manufacturing bearings or bearing surfaces, the bearing surface layer may be obtained by spraying metal onto a base. The bearing or sliding faces thus obtained can be adapted to many purposes and exhibit excellent properties under unfavorable conditions. Yet such bearings are not yet in general use because of a tendency of the surface layer to detach itself from the base under operating conditions.

To obviate this defect attempts have been made to arrange adhesive layers between the base and the bearing surface layer for which purpose various methods have been used. According to one suggestion the base to be coated is immersed in a bath of solder whereupon the bearing metal is sprayed onto the liquid solder. This results in formation of an alloy between the liquid bearing metal and the liquid solder. This method however has not proved satisfactory, since the liquid solder is driven away to a great extent by the bearing metal which is sprayed on. According to another proposal an intermediate layer of metal is sprayed onto the base which metal adheres as well as possible to the base and the bearing surface layer, whereupon the bearing surface layer is sprayed on and the bearing thus obtained is heated to about 700° C. in a protective atmosphere of an inert gas. Due to the necessity of providing a protective atmosphere which is to prevent oxidation at the high temperatures involved, this method is cumbersome and time consuming.

The present invention provides a novel method of manufacturing bearings or bearing surfaces consisting of various layers of metal in which the bearing surfaces are attached to a base by means of an intermediate layer, but besides a mechanical attachment of the respective layers to one another there is also achieved a thermo-diffusion or formation of alloy between contacting surfaces.

According to the invention in a process for the manufacture of a metal bearing or bearing surface consisting of a plurality of layers in which an intermediate layer is first applied to a base and the bearing surface proper is sprayed thereon, the base layer has a coating applied as a solder or by electro-plating, whereupon a layer of an adhesive material is sprayed on at a temperature below the melting temperature of the solder coating and thereupon the bearing surface is applied over this layer of adhesive material at a temperature below the melting temperature of the layer.

The method is preferably carried out in such a manner that the temperature does not fall below 150° C. at any stage. Satisfactory results have been obtained when the adhesive layer has been applied to the base at a temperature of 200° C. and the bearing surface at a temperature of 150–180° C. By not exceeding these temperatures when applying the adhesive layer the coating layer of solder as such is maintained. The adhesive material sprayed on is not only mechanically attached to the solder layer, but also alloys therewith at the contacting surfaces. A similar mechanical and thermal unification takes place between the adhesive layer and the bearing surface. Oxidation of the various layers, which is fatal to adhesion is thereby minimized if not completely prevented so that use of a protective atmosphere is no longer necessary.

If desired, the advantages of the method according to the invention can be further increased by the use of a particular metal spray wire which is provided with a core consisting of a flux. When spraying with such a hollow wire filled with flux on vaporizing of the flux any oxides and any further impurities are removed; at the same time an atmosphere of a protective gas is maintained in the vicinity of the spray jet which is not indispensable in carrying out the method according to the invention, it is true, but the influence of which certainly is an advantage, particularly in view of the fact that it is obtained without a special technical equipment (high cost) and, to a certain degree "incidentally." As a result a completely sound solder coupled with active thermo-diffusion is obtained between the separating faces of the layers, so that by the arrangement of the layers according to the invention a so-called "sound connection" is achieved for the first time in the metal spraying technique, i.e. the product obtained produces a clear and steady vibration when stricken.

Hollow spray wires provided with a core, or so-called "spray tubes" especially when the core consists of a flux capable of providing an atmosphere of a protective gas according to the invention can also be used together with a core consisting completely or partly of a powdery incombustible medium. In this case when the latter type of core is or contains a constituent of the bearing layer proper better sliding properties of the bearing are possible. Examples of such substances are mica, molybdenum sulphide or the like acting substances which, during spraying, are distributed over the surface being sprayed and accordingly become intimately and uniformly mixed with the sprayed metal.

Bearing layers made in such a manner according to the invention not only display the advantages of a bearing surface obtained by means of a metal spraying method, but moreover the particular advantages of a bearing surface provided with particular additions improving the running properties. For instance, molybdenum sulphide sprayed on simultaneously according to the invention enables bearings according to the invention, to operate as so-called dry bearings, i.e. without lubrication.

The obtaining of intermetallic bonds which adds to adhesion between the various layers is further promoted when in selecting the metals for the various layers, account is taken of the Van der Waals' molecular attraction among these metals, finding their origin in the constitution ratios of the metal atoms in question, mainly in the construction of the electron shells of the metal atoms which are concerned in the achievement of such bonds.

In fact it amounts to achieving in the intermetallic phase an interaction among the various constitution ratios of the layers arranged one behind the other. For this reason, in principle, elements of the sub-groups of the periodic system are used for the base and the adhesive intermediate layer while elements of the main groups of the periodic system of the elements or their alloys for the solder and the bearing surface. For the base all elements having metallic characteristics of the sub-groups of the third and fourth periods come into consideration, e.g. titanium, vanadium, chromium, manganese, iron, cobalt, nickel, copper and zinc.

In this connection aluminum should be considered as one of the sub-group elements on account of its properties which are of importance here; which is completely justified by the known properties of aluminum that enable it to be classified both in the main and sub-groups.

For the base preferably, iron, copper or aluminum or their alloys are used. Satisfactory results will be obtained in using for the solder, elements with metallic character in the third to sixth periods of the periodic system e.g., tin, antimony, tellurium, lead or bismuth, and for the adhesive intermediate layer, elements of the first sub group of the periodic system, copper, silver and gold.

For the bearing surface all elements with metallic character of the main groups in the second to sixth periods of the periodic system come into consideration which elements, if desired, may form alloys with the elements of the sub-groups of the fourth period. Here the elements carbon, aluminum, silicon, selenium, tin, antimony, tellurium, lead, bismuth, titanium, vanadium, chromium, manganese, iron, cobalt, nickel, copper or zinc are concerned.

According to the invention the bearing layer may also be provided with a powdery substance to improve the bearing properties, this powder being arranged in the interior of a spray tube according to the invention and being sprayed on simultaneously with the bearing layer.

The individual metal atoms are kept together in a metal by an "electron cloud" consisting of electrons derived from the electron shells of the metal ions, which electron cloud surrounds the residual atoms ionised thereby. The elements in the main groups of the periodic system have the characteristic that, in contradistinction to the elements in the sub-groups, they produce defined hydrogen compounds and owing to such property are excellently capable of binding protons or ionised atoms in a certain manner. Such compounds are obtained on accumulation of elements having a metal character of the main groups in the periodic system. When the order of the layers, in manufacturing bearings in accordance with the invention, is so chosen that elements of the main and sub-groups of the periodic system alternate with one another, Van der Waals' bonds are achieved at the separation faces and therewith intermetallic phases. Due to formation of these intermetallic phases at least a part of the atoms which are present in the surface of a layer are arranged between those atoms present in the surface of the other layer. Although by reason of the proposed order of metals the radii of the atoms in the separate layers are approximately equal to each other, in each layer, from layer to layer the atoms individually are strongly different from each other, so that at the contact surfaces small atoms lie beside large atoms, owing to which a common system can be more easily obtained than when both kinds of atoms would have the same size. The atoms of the elements in the sub-groups of the periodic system are essentially smaller in size than those of the elements in the main groups.

Elements of the sub-groups of the periodic system have small ions and also small atom radii. The strength of attraction of different ions and atoms is in inverse proportion to the atomic radius. The average radius for achieving the metallic bonds in the elementary condition under observance of the above-mentioned rules appears to be 1.4 A. for the base metal, 1.8 A. for the solder and 1.4 A. for the adhesive layer. The radii for effecting the metallic bond within these layers, consequently, are on an average equal, so that the separate layers display the desired homogenity Furthermore the atom radii for the base metal and the intermediate layer are on an average equal, but the atom radii of the solder are clearly different. In this respect, consequently, the solder lies between the two other layers and since these other layers display the same atom radii for the metallic bond in the elementary condition, the binding forces of the solder, consequently, are completely uniformly charged. The binding action between the solder and the base layer metals, consequently, is equal to the binding action with the adhesive layer by which the fixed attachment of the adhesive layer to the base metal can be explained.

The method according to the invention also is suitable for manufacturing band bearings in which a base, on which a solder layer, an adhesive layer and a bearing layer are arranged is removed afterwards. The bearing layer can also be sprayed on in various layers, it being efficient to alternate always a hard layer with a soft layer. The bearings manufactured in this manner are very resilient and flexible, which is particularly advantageous for use as band bearings. Moreover the quality of such a bearing may be improved according to the invention by spraying the bearing layer on with the aid of a hollow spray wire which is filled with a powder substance improving the bearing properties.

In the following examples, the percentage figures refer to quantities by weight.

*Example I—Manufacture of a Simple Bearing*

Base: Iron, alloyed with 0.1% of chromium and 0.3% of manganese.
Solder: Alloy of 80–90% of tin, 1–2% of bismuth, the remainder being lead.

The raw material on which the solder layer is to be applied first is preheated to 200° C. and thereupon immersed in a bath of molten solder, at a temperature of 340° C. Before the immersion into this bath the raw material may, if desired, be treated with a solder flux in the area to be coated.

Adhesive layer: copper of average purity (i.e. it is not necessary to employ electrolytic copper).

The article provided with the solder layer is raised to a temperature of 200° C., and at this temperature the adhesive layer is sprayed onto it.

Bearing surface layer: aluminum alloy with 1.5% of silicon, 5.0% of zinc and 1.0% of nickel.

The article provided with the adhesive layer is allowed to cool to 160° C., and when at this temperature the bearing surface layer is sprayed onto the desired thickness.

*Example II—Another Method of Manufacturing a Simple Bearing*

Base: Duraluminum.
Solder: Aluminum friction solder with an operation temperature of 280° C.

At a temperature of 300° C. the friction solder is arranged in the manner usual in the technique.

Adhesive layer: hollow spray wire of copper of moderate purity, filled with borax as a flux.

The object provided with the solder layer is brought to a temperature of 200° C., and when at this temperature the adhesive layer is sprayed onto it.

Bearing surface layer: alloy of 80% of tin, 11–12° of antimony, 6–9% of copper and 0–2% of lead.

The object provided with the adhesive layer is allowed to cool to 160° C., when the bearing surface layer is sprayed onto it at this temperature in the desired thickness.

*Example III—Manufacture of Band Bearing Consisting of Various Layers*

Base: To be chosen such that a solder layer can be arranged which can be sprayed on, but that no permanent adhesion is achieved with the solder. It should be possible to draw the solder finally, together with the layers sprayed thereon, from the base. These requirements are readily satisfied by a simple aluminum plate on which a skin, obtained by rolling, is still present which should not be roughened. Use should be made of usual copper solder since special aluminum friction solder would adhere so fixedly to the aluminum plate that it could not be removed therefrom at a later stage.

Solder: Alloy of 75–85% of tin and 2–9% of antimony which for the rest consists of lead.

The aluminum plate is first heated to a temperature of 200° C. and then immersed in a bath of molten solder at a temperature of 350° C. A pretreatment with liquid soldering flux may be omitted.

Adhesive layer: Copper alloy containing 1–3% of silver.
The adhesive layer is sprayed onto the aluminum plate to which a layer of solder was applied.

Bearing layer: Two alloys are sprayed on in alternate layers. (a) The first and each subsequent odd layer: an alloy consisting of 63% of lead, 35% of tin and 2% of antimony. (b) The second and each subsequent even layer: an alloy consisting of 60% of copper, 20% of nickel, 12% of zinc and 8% of tin.

The aluminum plate provided wth the adhesive layer is allowed to cool to 170° C., when the said alloys are sprayed on at this temperature in alternating layers until the bearing surface has been built up to the desired thickness.

After the spraying on of the bearing surface all layers sprayed on and the solder layers can together be drawn from the aluminum plate.

*Example IV—Simple Bearing With Plated Solder*

Base: Alloy of 50–60% of copper, 40–45% of zinc, 0–4% of tin and 0–1% of lead.
Solder: Alloy of 10–20% of tin, the remainder aluminum.

The raw material to which the solder layer is to be applied is first brought to a temperature of 230° C., when the solder in band form is plated thereon in the manner usual in the technique under elevated pressure and temperature.

Adhesive layer: Hollow spray wire of copper moderate purity filled wtih a flux consisting of a mixture of borax and ammonium chloride.

The object with the plated solder layer thereon is allowed to cool to 200° C., when the adhesive layer is sprayed on at this temperature.

Bearing layer: Alloy of 8–12% of tin, 3–5% of cadmium, the remainder lead.

The object provided with the adhesive layer is allowed to cool to 170° C., when the bearing layer is sprayed on at this temperature to the desired thickness.

*Example V—Bearing With Addition for Improving the Running Properties Sprayed on Simultaneously*

Base: Ordinary structural steel alloyed with carbon.
Solder: Alloy of 50–70% of tin, 1–2% of bismuth, 1–3% of antimony, the remainder lead.

The raw material is first preheated to a temperature of 210° C. and then for application of the solder layer immersed in a bath of liquid molten lead at a temperature of 345° C. Before immersion the raw material, if desired, may be treated with solder water and/or flux over the area to be sprayed.

Adhesive layer: Spray tube or copper of moderate purity, filled with ammonium chloride as a flux.

Bearing layer: Spray tube of aluminum, alloyed with 0.5–1% of silicon, 3–7% of zinc and 0.8–1.5% of nickel. The spray tube contains molybdenum sulphide in powdered form with an average particle size of about 1µ.

The raw material with the applied adhesive layer is allowed to cool to 165° C. and at this temperature the running surface is sprayed on in the intended thickness.

What we claim is:

1. The method of manufacturing a metal bearing which comprises preheating a base consisting of iron alloyed with 0.1 percent, by weight, of chromium and 0.3 percent, by weight, of manganese to a temperature of about 200° C.; immersing the base into a molten solder at a temperature of about 340° C., said solder consisting of between 80–90 percent, by weight, of tin, 1–2 percent, by weight, of bismuth and the remainder being lead; withdrawing the solder-coated base from said molten solder and forming an adhesive layer by spraying onto the solder coat copper at a temperature of about 200° C.; cooling the base to a temperature of about 160° C.; and forming a bearing surface layer by spraying onto the adhesive layer an aluminum alloy containing 1.5 percent, by weight, of silicon, 5 percent, by weight, of zinc and 1 percent, by weight, of nickel.

2. The method as set forth in claim 1, further comprising the step of treating said base with a solder flux prior to immersion into said molten solder.

3. The method of manufacturing a metal bearing which comprises coating a duraluminum base with aluminum friction solder at a temperature of between about 280–300° C.; forming an adhesive layer by spraying onto the solder coat copper from a borax-filled hollow spray wire at a temperature of about 200° C.; cooling the base to about 160° C.; and forming a bearing surface layer by spraying onto the adhesive layer an alloy consisting of about 80 percent, by weight, of tin, about 11–12 percent, by weight, of antimony, about 6–9 percent, by weight, of copper and up to 2 percent, by weight, of lead.

4. The method of manufacturing a band bearing which comprises heating a rolled aluminum plate to a temperature of about 200° C.; immersing the plate into a bath of molten solder at a temperature of about 350° C., said bath consisting of between about 75–85 percent, by weight, of tin, between about 2–9 percent, by weight, of antimony and the remainder being lead; withdrawing the solder-coated plate from said bath and applying thereto an adhesive layer by spraying onto the solder coat an alloy consisting of 1–3 percent, by weight, of silver and the remainder being copper; cooling the plate to about 170° C.; alternately spraying onto the adhesive layer at least one layer of a first alloy consisting of 63 percent, by weight, of lead, 35 percent, by weight, of tin and 2 percent, by weight, of antimony, and at least one layer of a second alloy consisting of 60 percent, by weight, of copper, 20 percent, by weight, of nickel, 12 percent, by weight, of zinc and 8 percent, by weight, of tin to build up a bearing layer of desired thickness; and stripping the solder coat together with said adhesive and bearing layers off said plate.

5. The method of manufacturing a metal bearing with plated solder which comprises the steps of preheating a base consisting of about 50–60 percent, by weight, of copper, about 40–45 percent, by weight, of zinc, up to about 4 percent, by weight, of tin and up to about 1 percent of lead to a temperature of about 230° C.; plating the base at an elevated temperature and pressure with a solder layer consisting of about 10–20 percent, by weight, of tin and the remainder being aluminum; cooling the solder-plated base to a temperature of about 200° C.; forming an adhesive layer by spraying onto the solder layer copper from a hollow spray wire filled with a flux consisting of a mixture of borax and ammonium chloride; cooling the base to a temperature of about 170° C.; and forming a bearing layer by spraying onto the adhesive layer an alloy consisting of about 8–12 percent, by weight, of tin, 3–5 percent, by weight, of cadmium and the remainder being lead.

6. The method of manufacturing a metal bearing with improved running characteristics which comprise preheating a base consisting of structural steel alloyed with carbon to a temperature of about 210° C.; immersing the base into a molten solder at a temperature of about 345° C., said solder being an alloy consisting of about 50–70 percent, by weight, of tin, about 1–2 percent, by weight, of bismuth, about 1–3 percent, by weight, of antimony and the remainder being lead; withdrawing the solder-coated base from said molten solder bath and forming thereon an adhesive layer by spraying copper from a spray tube filled with ammonium chloride as a flux; cooling the base to about 165° C.; and spraying onto the adhesive layer a bearing layer from a spray tube of aluminum alloyed with 0.5–1 percent, by weight, of silicon, 3–7 percent, by weight, of zinc and 0.8–1.5 percent, by weight, of nickel, said spray tube containing molybdenum powder with an average particle size of about $1\mu$.

7. The method as set forth in claim 6, further comprising the step of treating said base with a material selected from the group consisting of solder water and flux prior to immersion into said solder bath.

References Cited in the file of this patent

UNITED STATES PATENTS

| | | |
|---|---|---|
| 1,302,563 | Klocke | May 6, 1919 |
| 1,358,311 | Harris | Nov. 9, 1920 |
| 1,501,266 | Brace | July 15, 1924 |
| 1,516,740 | King | Nov. 25, 1924 |
| 1,970,024 | Stockfleth | Aug. 14, 1934 |
| 2,120,737 | Domm | June 14, 1938 |
| 2,283,217 | McCullough | May 19, 1942 |
| 2,459,172 | Luetkemeyer et al. | Jan. 18, 1949 |
| 2,607,983 | McBride | Aug. 26, 1952 |
| 2,754,225 | Gfeller | July 10, 1956 |
| 2,833,667 | Dalton | May 6, 1958 |